US006525835B1

(12) United States Patent
Gulati

(10) Patent No.: US 6,525,835 B1
(45) Date of Patent: Feb. 25, 2003

(54) METHOD AND SYSTEM FOR PARCEL LABEL GENERATION

(75) Inventor: Sanjay Gulati, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/461,316

(22) Filed: Dec. 15, 1999

(51) Int. Cl.[7] .......................... G06F 15/00; G06F 13/00

(52) U.S. Cl. ................ 358/1.18; 358/1.15; 235/462.01; 235/462.02; 235/462.07; 235/462.09; 235/462.1

(58) Field of Search ............................... 358/1.18, 1.15; 235/462, 432

(56) References Cited

U.S. PATENT DOCUMENTS

| | | | | |
|---|---|---|---|---|
| 5,315,508 A | * | 5/1994 | Bain et al. | 700/90 |
| 5,345,091 A | * | 9/1994 | Craig et al. | 235/462.15 |
| 5,497,450 A | * | 3/1996 | Helmbold et al. | 358/1.1 |
| 5,621,864 A | * | 4/1997 | Benade et al. | 358/1.18 |
| 6,220,509 B1 | * | 4/2001 | Byford | 235/375 |
| 2002/0023955 A1 | * | 2/2002 | Frank et al. | 235/382 |

* cited by examiner

*Primary Examiner*—Edward Coles
*Assistant Examiner*—Alan Rahimi

(74) *Attorney, Agent, or Firm*—Ronald Reichman; Angelo N. Chaclas

(57) ABSTRACT

A system for creating a label design for a parcel shipping or conformance label, according to a specification of the label design and a specification of a target printer type. The system includes a label specification encoder into which a user provides inputs corresponding to a label design specification. The label specification encoder provides a so-called neutral language specification of the label, i.e. a specification suitable for automatic translation into control codes and printer commands for various types of label printer. The system also includes a label design generator, responsive to the neutral language specification, and further responsive to a target printer type provided as an input by a user. The label design generator provides a printer-specific label design. Capability for printing a two-dimensional bar code is provided, along with a capability for generating a check digit for a bar code. In addition, in some applications, the label specification encoder includes a copy field capability, for generating a parcel identifier from a package type indicator, a manufacturer identifier, and a package serial number. Finally, the label specification encoder enables field masking so as to create from a single stored field a plurality of printed fields separated by one or another delimiter. In some applications, there is also provided a printer application program interface (API), for printing a label with parcel-specific data, the printer API responsive to the printer-specific label design, and further responsive to the parcel-specific data.

6 Claims, 3 Drawing Sheets

METHOD AND SYSTEM FOR PARCEL LABEL GENERATION

TECHNICAL FIELD

The present invention pertains to designing and creating parcel labels for shipping parcels, and more particularly to a system for designing parcel labels that enables a design having a two-dimensional bar code.

BACKGROUND OF THE INVENTION

Parcel labels, such as shown in FIG. 3, are often designed and stored in a label design file on a computer, and when a particular kind of label is needed for shipping a parcel, the corresponding designed label is selected from the label design file, usually in a computer database, and printed, along with data, creating a label that can be affixed to a parcel to be shipped. The data on the label is the information not already included on a label by design, i.e. the variable information. In some cases, the data includes the recipient address information and other information needed to deliver the parcel and to track the parcel in the course of its delivery. In other cases, however, the label may be intended for use for shipping items to a particular recipient, in which case all or part of the shippee address might be included in the label design, but the shipper address might vary (because the shipper might ship to the same recipient from various locations).

For example, FIG. 3 shows a uniform commercial carrier (UCC) label format specification 50 for a label design intended for use by UARCO incorporated when shipping a manufactured item to Jumbo Sports, a retailer. The label format specification 50 is for a kind of label called a compliance label, because it does not specify a carrier or a type of delivery (such as ground or overnight). The UCC label format specification allows different labels to be designed by providing for optional uses of different portions of the label, such as the portion 51 for indicating either a carrier name, a bill of lading number, or other items of information. Some of the information shown on the sample printed label 52 is data, i.e. it is information varies from printed label to printed label according to the same design, and some other of the information is design information, i.e. it is designed into the label. On the sample printed label 52, the larger pitch text in a portion 54 (such as the text "CARRIER:" in the portion 54 allowing optional uses) indicates that the printed information is designed into the label.

Another kind of label is a so-called shipping label, and includes more detail in the design, such as that the label is suitable only for use when shipping by a particular carrier, and possibly for a particular type of delivery. The present invention is concerned with creating a design for either kind of label.

A design is sometimes created according to the following scenario. A label designer receives from a label owner (Jumbo Sports in the above example referring to FIG. 3) a set of specifications for a label. The label designer then designs the label and saves the design in a computer file. The computer file is then provided to the label user, such as a company that ships merchandise to the label owner. Thus, the label owner is sometimes a recipient. When a user sends merchandise to the label owner, the user provides whatever information not already designed into the label, such as the precise location from which the parcel is being shipped.

Other scenarios are possible, including a scenario in which the label owner is instead the user (sender) of a label, and uses the label design to create labels for use in sending merchandise to customers in response to orders.

In some cases, the label designer uses either a graphical user interface (GUI) or a more specialized interface for designing a label. An example of a specialized interface is one provided on an AS/400 computer system (which may not provide a GUI interface).

The prior art teaches label designer systems for designing labels having so-called one-dimensional bar codes printed on a label. These bar codes provide one level of information in the space they occupy. More recently, two-dimensional bar codes have been developed to encode significantly more information in substantially the same area on a label. The Maxicode bar code is 1" by 1" and can encode 99 bytes of information. The PDF417 bar code, also a two-dimensional bar code, is variable length and can encode up to 350 bytes of information.

What is needed is a system for designing labels that allows designing a label with two-dimensional bar codes. Further what is needed is a system that allows designing a label so as to include a mechanism by which to detect forgery of a bar code. Still further what is needed is a system that automatically determines a sufficiently unique, single parcel identifier from individual identifiers of various elements of a parcel, such as the package type, the manufacturer identifier, and the serial number of the type of packaging (indicating the particular type of packaging); ideally, such a parcel identifier is then designed into the bar code of a label.

SUMMARY OF THE INVENTION

Accordingly, the present invention provides a parcel label design system and corresponding method, the system including: a label specification encoder, responsive to a label design specification, for providing a neutral language specification of the label, the neutral language specification suitable for automatic translation into control codes and printer commands for a plurality of types of label printer; and a label design generator, responsive to the neutral language specification for a label design, and further responsive to a target printer type, for providing a printer-specific label design.

In some aspects of the invention, the label design specification includes a specification of a two-dimensional label.

In another aspect of the invention, the label specification encoder includes a means for generating a check digit, as part of a bar code, for detecting tampering of the bar code. In a further, related aspect of the invention, the check digit is computed as a mathematical combination of predetermined weights associated with each bar of the bar code, the value associated with each bar of the bar code, and a predetermined scaling operation to ensure that the check digit falls within a pre-determined range.

In another aspect of the invention, the label specification encoder includes a copy field capability, for generating a parcel identifier from a package type indicator, a manufacturer identifier, and a package serial number.

In yet another aspect of the invention, the label specification encoder enables field masking so as to create from a single stored field a plurality of printed fields separated by one or another delimiter.

In yet a still further aspect of the invention, a printer application program interface (API) is also provided, for printing a label with data (information specific to a parcel). The printer API is responsive to the printer-specific label design, and further responsive to the parcel-specific data.

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION

Figure 1:
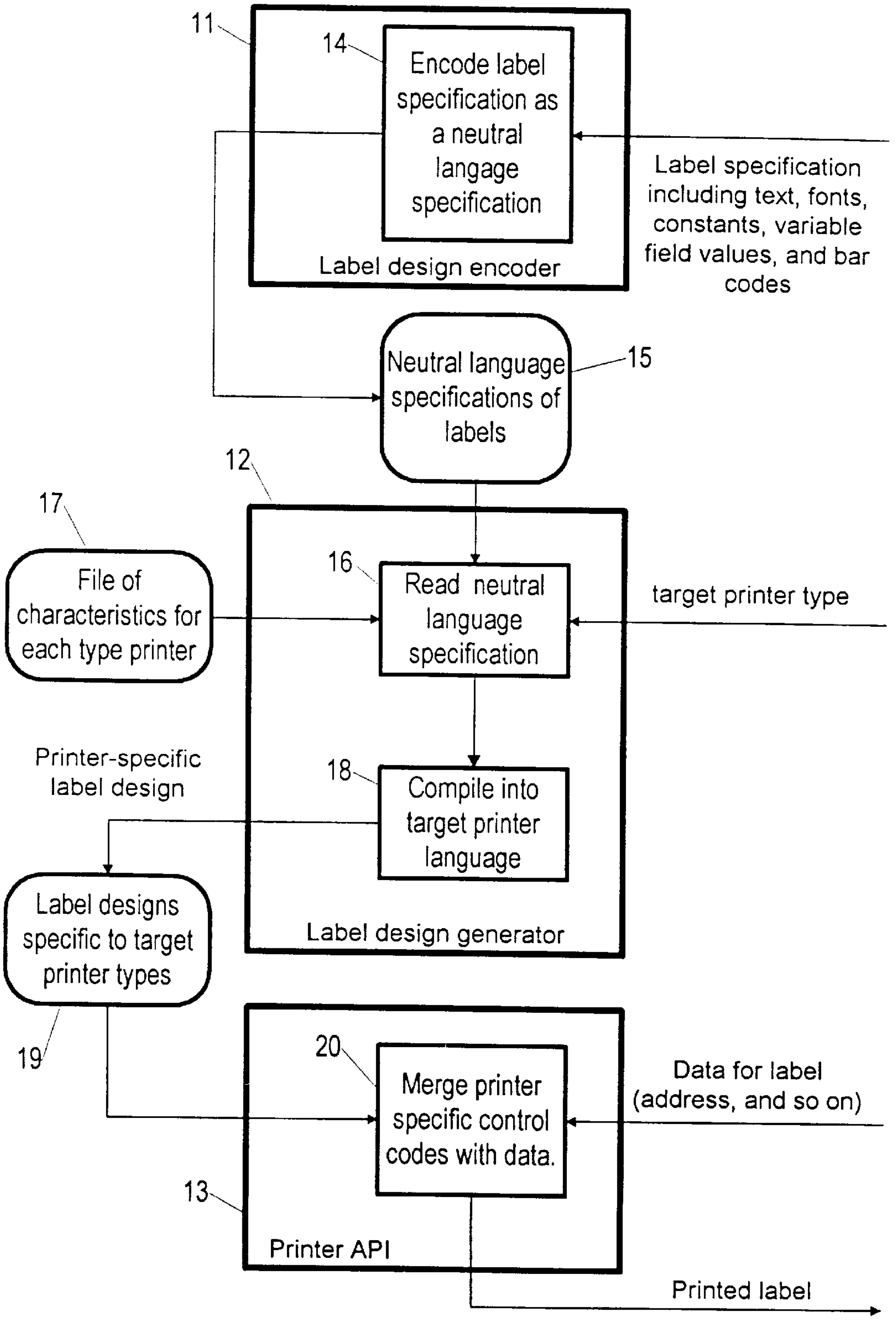
FIG. 1 is a block diagram/flow diagram showing a system for designing and printing a label, according to the present invention.

Referring now to FIG. 1, a system for designing a label, according to the preferred embodiment of the present invention, includes a label specification encoder (software application) 11, a label design generator (software application) 12, and a printer application program interface (API) 13.

The label specification encoder 11, in a step 14, accepts as input a label design specification, including text, fonts, constants, variable field values, and bar codes to be printed on a label in prescribed positions, and provides a so-called neutral language specification of the label design, i.e. a machine readable description suitable for automatic translation into control codes and printer commands for a plurality of types of label printer. A user manually inputs the label design specification into the label design encoder 11. In the preferred mode, the label specification encoder 11 executes on a computer hosting a graphical user interface (GUI) and is a "What-you-see-is-what-you-get" (WYSIWYG) application; the user can see what the label being designed will look like when printed. The label design encoder 11 saves the neutral language specification in a file 15 of such specifications.

In some applications, the label design encoder 11 is hosted by a non-GUI computer system, such as an AS/400 system, and then may not be a WYSIWYG application.

The label design generator 12, in a step 16, reads the neutral language specification for a label in the specification file 15, and accepts as input a target printer type, and also refers to a file 17 of characteristics for each printer type to provide input to a next step 18 in which the printer-specific label design is provided by translating the neutral language specification into the target printer language, so that it includes control codes and commands specific to the target printer type. The label design generator 12 saves the printer-specific label design in a file 19 of label designs specific to target printer types.

The printer-specific label design is in some applications provided to a user for use with the printer API. In such applications, in a step 20, data for a label is merged with the printer-specific label design from the file 19 of label designs specific to target printer types and a label complete with data is printed.

Figure 2:
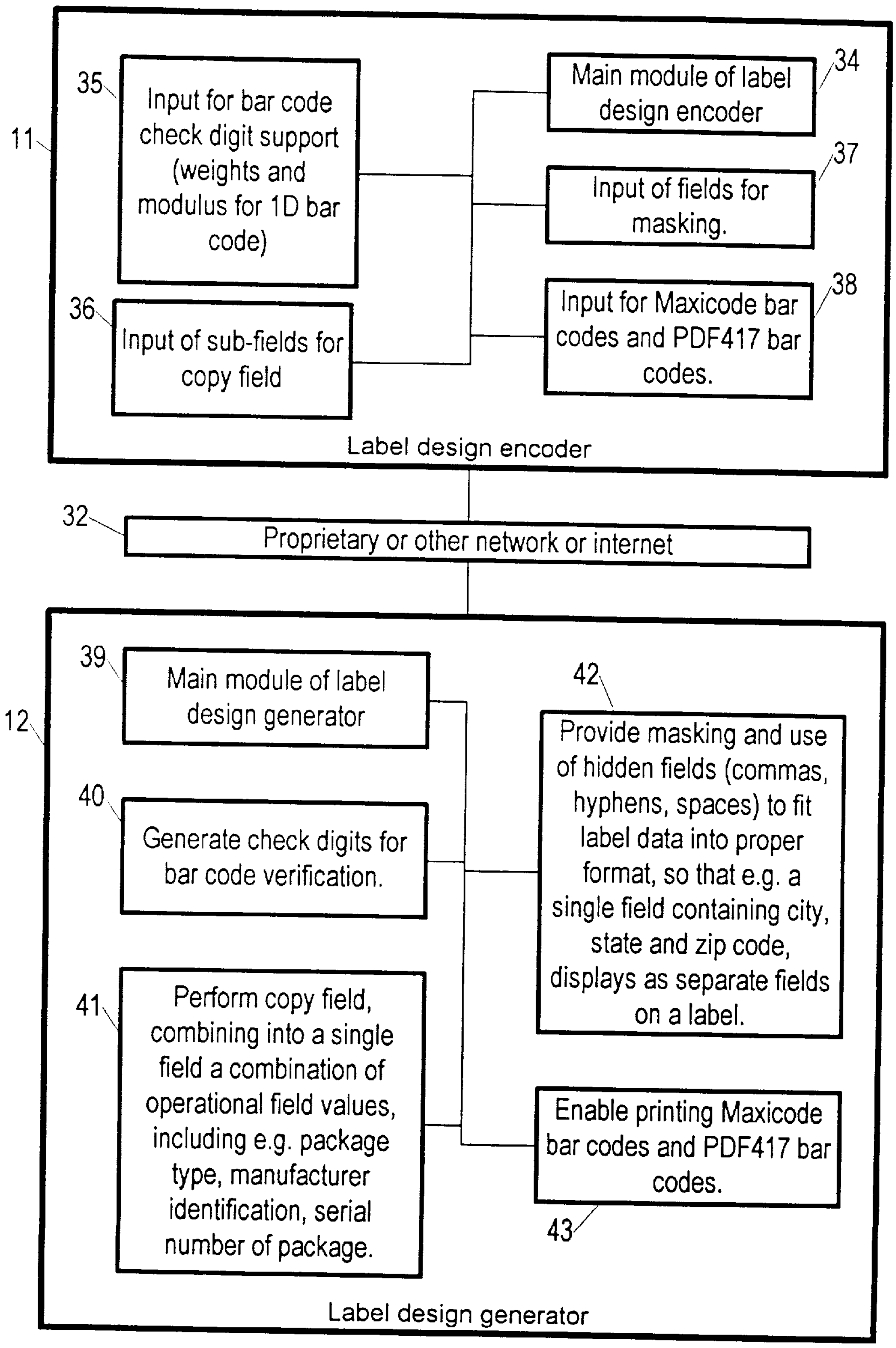
FIG. 2 is a block diagram showing particular elements of a system according to the present invention.
Figure 3:
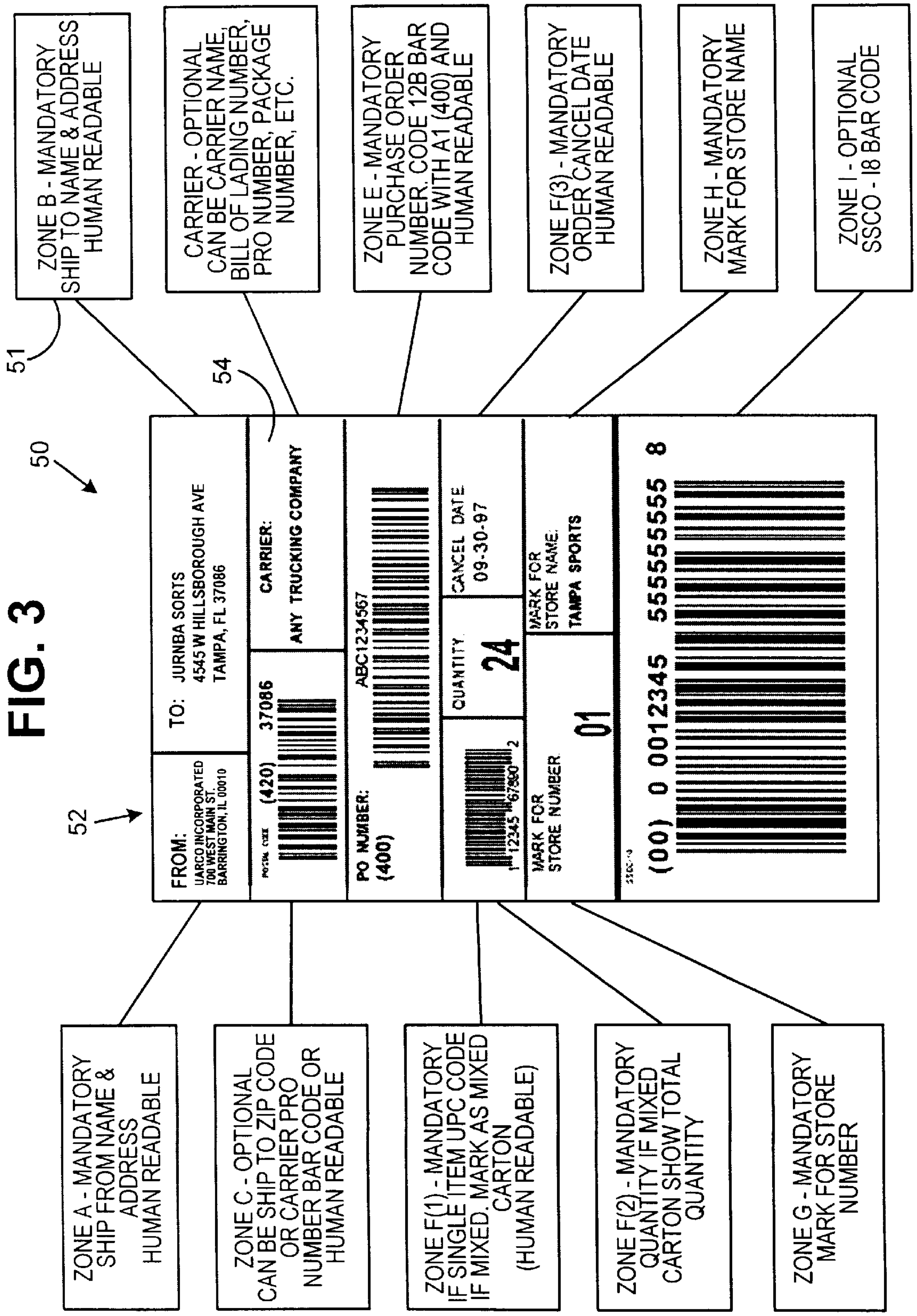
FIG. 3 is an illustration showing a label design specification (for a so-called compliance label) used as a possible specification for a label design.

Referring now to FIG. 2, in the preferred embodiment, the label design encoder 11 includes a main module 34, which can call up various capabilities of the label design encoder 11, including a module 35 providing a capability to input information needed to generate a bar code check digit, i.e. a weight for each bar of the bar code and a modulus, in case of some check digit generation algorithms. In one such algorithm, a check digit C is computed by taking a weighted sum of the digits $d_i$ corresponding to each bar of a bar code using the inputted weights $w_i$, and the weighted sum is then divided by an inputted modulus M to bring the check digit within a predetermined range, according to the formula:

$$C = \frac{\sum_i w_i d_i}{M}.$$

The label design encoder main module 34 also includes a module for inputting sub-fields to be combined into a single field using a copy field function. This module, therefore, is of use in creating from a package type, a manufacturer identifier and a serial number for a particular package, a single parcel identifier, sufficiently unique to track the parcel, according to the prescription:

Package Type+ManufacturerIdentifier+
PackageSerialNumber®ParcelIdentifier.

The label design encoder main module 34 also includes a module for inputting fields for a masking operation; i.e., inputting a number of individual fields corresponding to a mask including delimiters separating the fields so that when the fields print, they are printed with the delimiters. For example, a mask can be provided for the combination of city, state and ZIP Code fields, the mask including a comma and a space to be printed between city and state and two spaces to be printed between state and ZIP Code. Thus, in such a masking, city+state+zip ®masked field=city+','+state+"+zip.

Finally, the label design encoder main module 34 includes a module for inputting two-dimensional bar codes, such as a so-called Maxicode, which is a 1 inch×1 inch two-dimensional bar code capable of encoding up to 99 bytes of information, or a PDF417 bar code, which is a variable length bar code capable of encoding up to 350 bytes of information. In the preferred embodiment, as explained above, the label design encoder 11 is hosted by a computer providing a GUI environment and the computer is usually a personal computer. As shown in FIG. 2, the computer hosting the label design encoder 11 is, in the preferred embodiment, connected to the label design generator 12 by a proprietary or other network or internet 32.

Still referring to FIG. 2, the label design generator 12 also includes a main module 39 which calls other modules 40–43 corresponding to the modules 35–37 of the label design encoder 11.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A parcel label design system, comprising:

a) a label specification encoder, responsive to a label design specification, for providing a neutral language specification of the label design, the neutral language specification suitable for automatic translation into control codes and printer commands for a plurality of types of label printer; and b) a label design generator, responsive to the neutral language specification, and further responsive to a target printer type, for providing a printer-specific label design, wherein the label specification encoder includes a means for generating a check digit, as part of a bar code, for detecting tampering of the bar code, and the check digit is computed as a mathematical combination of pre-determined weights associated with each bar of the bar code, the value associated with each bar of the bar code, and a predetermined scaling operation to ensure that the check digit falls within a pre-determined range.

2. The parcel label design system of claim 1, wherein the label design specification includes a specification of a two-dimensional label.

3. The parcel label design system of claim 1, wherein the label specification encoder includes a copy field capability, for generating a parcel identifier from a package type indicator, a manufacturer identifier, and a package serial number.

4. The parcel label design system of claim 1, wherein the label specification encoder enables field masking so as to create from multiple stored fields a plurality of printed fields separated by one or another delimiter.

5. The parcel label design system of claim 1, further comprising a printer application program interface (API), for printing a label with parcel-specific data, the printer API responsive to the printer-specific label design, and further responsive to the parcel-specific data.

6. A method for providing a parcel label design, the label design being in terms of printer-specific control codes, the method comprising the steps of:

a) translating a label design specification into a neutral language specification of the label design providing a bar code check digit, the check digit computed by combining pre-determined weights associated with each bar of the bar code, the value associated with each bar of the bar code, and a predetermined scaling operation to ensure that the check digit falls within a pre-determined range;

(b) using a copy field function for generating a single field from a plurality of individually specified items of information;

(c) using a masked field utility for specifying that each of a plurality of sub-fields of a single masked field is to be printed, and for specifying a delimiter for separating each sub-field; and (d) specifying in the neutral language specification a two-dimensional bar code; and (e) generating a printer-specific label design for a specified target printer based on the neutral language specification, the printer-specific label design being in terms of control codes specific to the target printer, the generating being performed using a file of characteristics for the target printer.

* * * * *